United States Patent

[11] 3,573,828

[72] Inventor Opie D. Hawley
 San Pedro, Calif.
[21] Appl. No. 816,353
[22] Filed Apr. 15, 1969
[45] Patented Apr. 6, 1971
[73] Assignee Northrop Corporation
 Beverly Hills, Calif.

[54] SYNCHRONIZATION INDICATOR
 7 Claims, 4 Drawing Figs.
[52] U.S. Cl. .................................................. 343/105,
 343/103
[51] Int. Cl. ...................................................... G01s 1/30
[50] Field of Search .......................................... 343/105,
 103, 100.7; 325/33

[56] References Cited
 UNITED STATES PATENTS
3,380,056 4/1968 Adams et al. .................. 343/105

*Primary Examiner*—Richard A. Farley
*Assistant Examiner*—Richard E. Berger
*Attorneys*—William W. Rundle and Willard M. Graham ABSTRACT: In order to synchronize a locally generated timing pattern in a receiver with a transmitted timing pattern as received, the strongest signal in the received pattern is separated from all others and transformed into a first pulse having the same timing as that strongest signal. At the same time, the pulse of the generated pattern which corresponds to the strongest station at the present receiver location, as determined by the operator's knowledge, is compared in time relation to the first pulse, and the generated pattern is advanced or retarded until exact synchronism of these two is achieved, as indicated by the reading of a meter in the output of a differential amplifier.

INVENTOR:
Opie D. Hawley

By William W. Rundle

AGENT

SYNCHRONIZATION INDICATOR

The present invention relates to radio navigation, and more particularly, to a means and method in a navigation receiver for indicating synchronization of a receiver-generated timing signal with a known pattern of transmitted signals from several fixed remote stations of known locations.

In the Omega long-range navigation system, for example, timing signals generated in a receiver must be synchronized with the transmitted pattern before position-determining readings can be taken from the radio set. The transmitted pattern consists of a series of signal bursts of known time duration and spacing, adjacent bursts being from different transmitting station locations up to a maximum of eight stations. Synchronism is achieved by advancing or retarding a receiver-generated pattern having the same repetitive rate until it coincides with the station pattern. Therefore, the operator must be provided with a comparison of the two patterns which indicates synchronism or the lack thereof.

Conventional indicator methods of this nature are not satisfactory for various reasons. Some require the operator to correlate an audio and a visual presentation, and hence hinge on a very subjective ability. Others require several adjustments to be made by the operator. Still others are complex, expensive, and take a relatively long period of time to obtain synchronism.

The objects of the present invention are to provide such a synch indicator which is inexpensive, not dependent upon the particular operator's reflexes, and which enables rapid synchronization.

Other objects and features of advantage will be noted from the detailed description of a specific embodiment to follow.

Briefly as to method, our invention comprises isolating the strongest one signal burst from the transmitted pattern, generating a timing pulse pattern having a series of pulses corresponding in width and spacing to the pattern of transmitted signal bursts, selecting a particular pulse of said generated timing pattern which is known to correspond to the burst of the strongest received station in said transmitted pattern, comparing the relative time occurrences of said strongest signal burst and said corresponding timing pulse, and advancing or retarding said generated pattern until said burst and pulse coincide in time.

Briefly as to apparatus, our invention comprises means to isolate the strongest one signal burst from the transmitted pattern and apply it to one input of a comparator device in real time, means to select any one of a series of a receiver-generated timing signal similar to the transmitted pattern and to apply it to the other input of the comparator device in real time, and indicator means connected to the comparator to show coincidence or noncoincidence of the signal burst and the timing pulse.

This invention will be more fully understood from a reading of the detailed description of specific apparatus to follow, with reference to the accompanying illustrative drawings, wherein.

Figure 2:
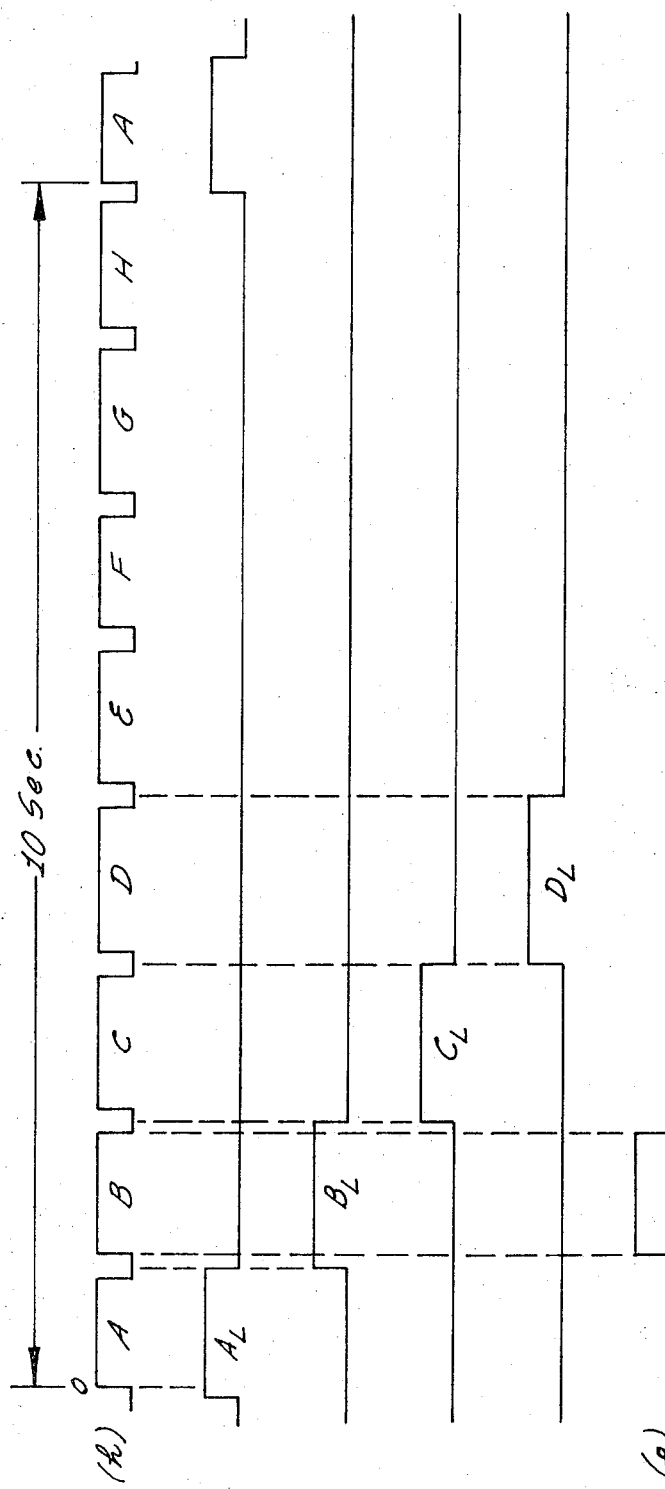
FIG. 2 is a timing pattern diagram showing the timing of various signals used in the present invention.

Referring first to FIG. 2 for a detailed description of the invention, the top line thereof represents the transmitted signal pattern used in the world-wide Omega long range navigation system. This is a 10 second repetitive pattern of transmission. During a first period A of 0.9 second, the pulse A represents a signal burst from one fixed VLF transmitter at a known station location. The signal frequency may be 10.2 kHz., for example. Then there is a 0.2 second space of no transmission, followed by a 1.0 second signal burst from a different station B. Next is another 0.2 second space and a 1.1 second burst from another station C, and so forth for the periods indicated. Thus, eight different stations can be accommodated, transmitting in this sequence, although not all eight need to be operating.

Figure 1:
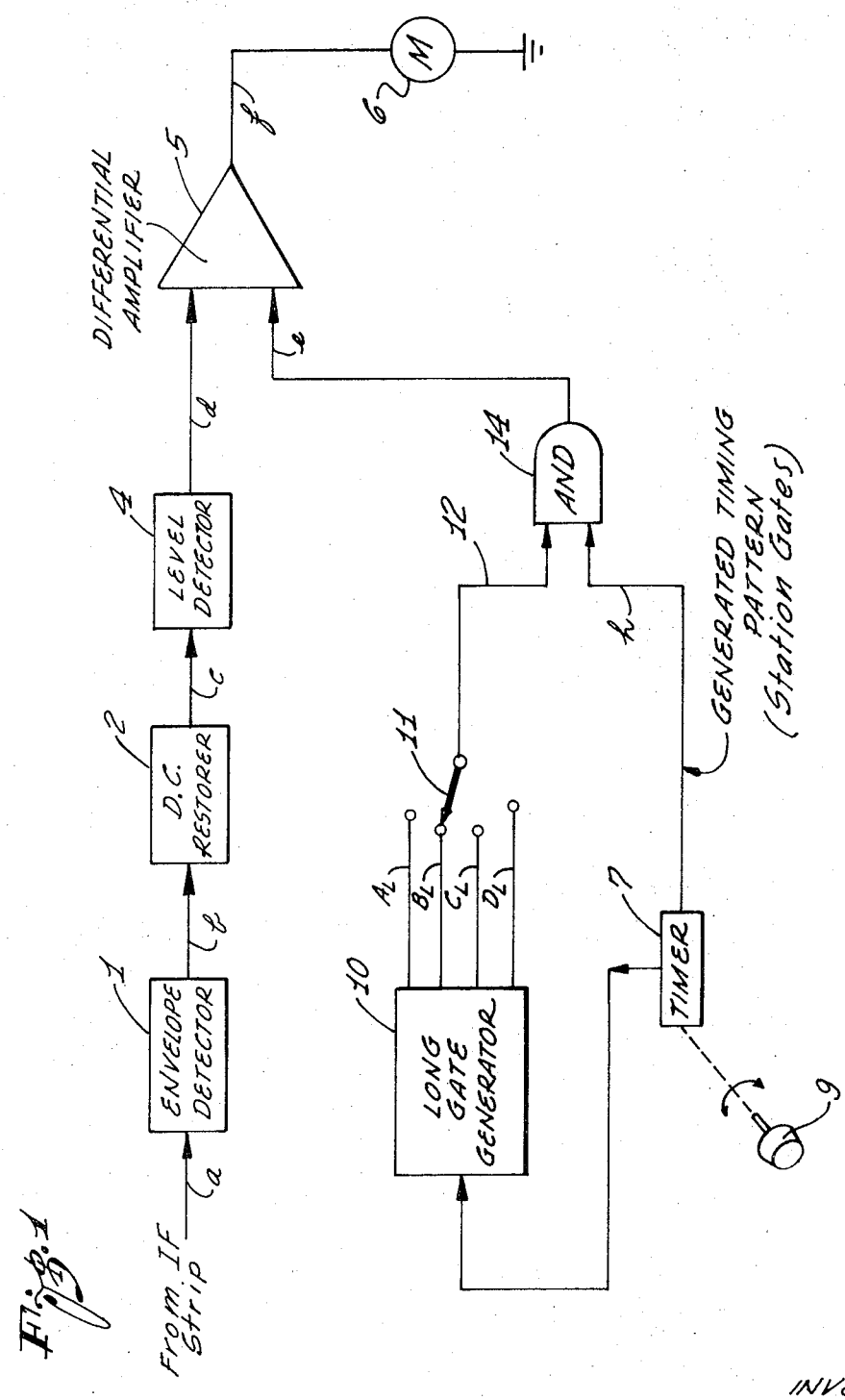
FIG. 1 is a block diagram showing the components and interconnections of the present indicator invention.

FIG. 1 is a portion of an Omega receiver on a ship, for instance, where the position is desired to be determined. The receiver picks up the 10 second transmitted signal pattern. At a suitable place in the IF strip before significant limiting has taken place, this received pattern is fed to an envelope detector 1. Suppose that the waveform $a$ in FIG. 3 comprises such a signal having a strong station followed by a weak station. The waveforms shown in this FIG. are not true to scale, but are illustrative only.

The envelope detector 1 produces an output waveform $b$ which is fed to a DC restorer 2 to clamp the maximum level of the strongest station at zero volts, as shown by waveform $c$. This is fed to a level detector 4 which produces an output $d_1$ only when the input to it is below its preset level. The amplitude of signal $d_1$ is essentially full power supply voltage. This is fed to one input of a differential amplifier 5 having a zero center DC meter 6 connected to its output.

The receiver contains a timer 7 which generates a timing pattern $h$ (FIG. 1) having a series of pulses exactly conforming in time to the transmitted signal burst timing. This locally generated pattern may be advanced or retarded in time by a manual control 9, but this does not change the width or spacing of the pulses. The timer 7 drives a long gate generator 10 which produces on separate circuits a wide pulse which begins 0.1 second before each station pulse starts and ends 0.1 second after the respective station pulse stops. Thus, as FIG. 2 shows, a long gate $A_L$ is generated on line $A_L$ corresponding to the time of generated station gate A except slightly longer, long gate $B_L$ is generated on line $B_L$, and so on. Since the long gates are produced from the generated timing pattern, they are advanced or retarded along with the adjustment of the timing pattern. The timer 7 and the long gate generator 10 do not in themselves form a part of the present invention since they are components of the navigation system.

By means of a selector switch 11, the receiver operator can select any one of the long gates as indicated in FIG. 1 for presentation on first input line 12 to an AND gate 14. Thus, there will be one pulse every 10 seconds appearing on input line 12, its timing with respect to the entire timing pattern being determined by the setting of the selector switch 11.

The generated timing pattern $h$ is fed from timer 7 to the other input of AND gate 14. Therefore, if long gate $B_L$, for example, is selected, the output of AND gate 14 will be as illustrated in line $e$ of FIG. 2. The amplitude of the pulse on line $e$ is equal to that of signal $d$ since a common power supply is used. Signal $e$ is fed to the second input of difference amplifier 5 such that the two signals $d$ and $e$ are subtracted in the output $f$.

Now from the operator's knowledge of the approximate present location of the receiver, and from his knowledge of the relative received signal strengths from the various stations at that approximate location, he can identify the station which is producing the strongest received signal. In order to check synchronization, he sets selector switch 11 to the position of the long gate of that identified station and observes the reading of the meter 6.

Figure 3:
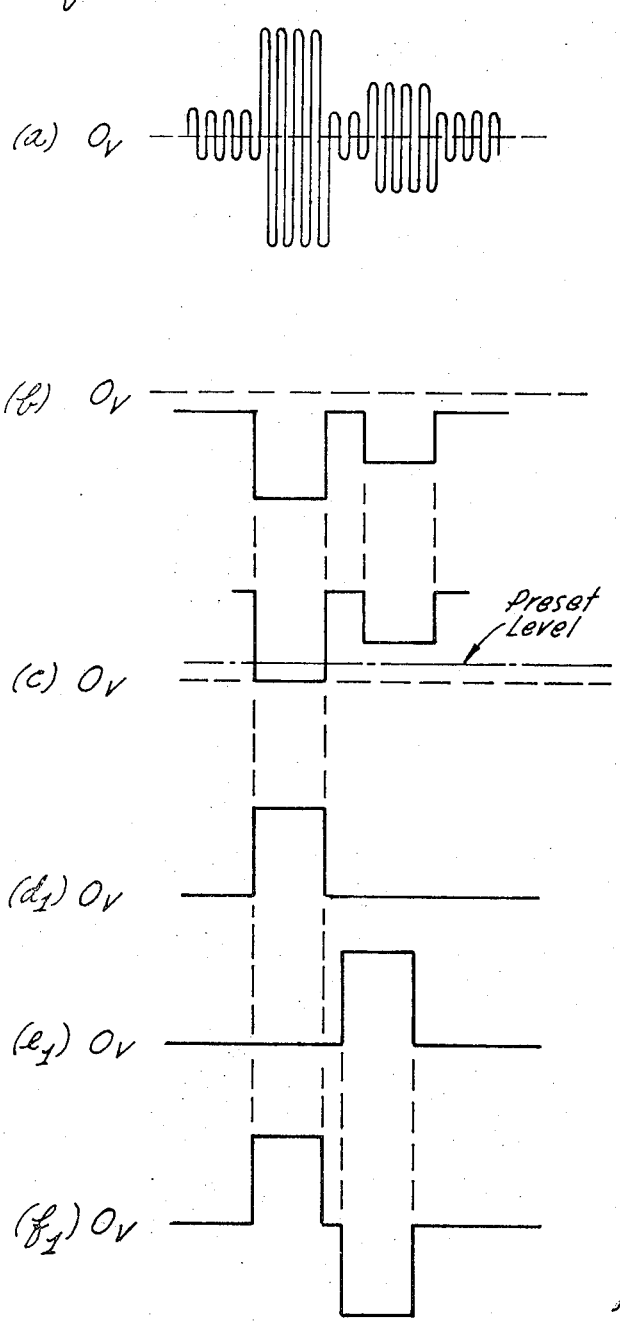
FIG. 3 is a symbolic waveform diagram showing the operation of the present invention when the timing signals in the receiver are out of synchronism with the 10 second transmitter pattern.
Figure 4:
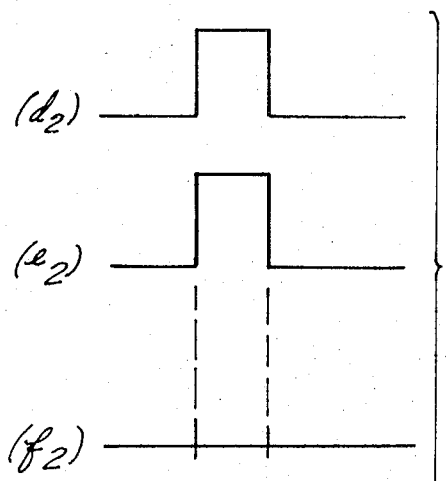
FIG. 4 is an abbreviated waveform diagram showing operation when synchronized.

Assuming the inputs $d_1$ and $e_1$ of FIG. 3 at difference amplifier 5, the meter indication will be as shown in line $f_1$ of the same FIG., i.e., a positive swing for about 1 second followed by a negative swing of about 1 second, this indication being repeated once every 10 seconds. The operator will then adjust the manual control 9 of timer 7 until the amplifier input signals are made to coincide as at $d_2$ and $e_2$ of FIG. 4. This situation will cause the meter needle to rest at zero as indicated at $f_2$ since the two pertinent pulses exactly cancel each other in the difference amplifier 5.

This zero indication proves the desired synchronism since the signal at $d$ came from the strongest signal burst of the transmitted pattern as actually received, and the signal at $e$ was selected from the generated pattern pulse corresponding to the station known to have the greatest received strength at that locality.

Thus it is seen that a simple and inexpensive means and method are provided to quickly indicate and obtain the desired synchronism. If necessary, due to extremely low signal-to-noise ratios, a separate control may be added to adjust the detection level of the level detector 4.

The indicating meter 6 may be replaced or supplemented by other equivalent visible or audible signal means, and the pulse handling apparatus may obviously be modified within the spirit and scope of the present teaching.

While in order to comply with the statute, the invention has been described in language more or less specific as to structural features, it is to be understood that the invention is not limited to the specific features shown, by that the means and construction herein disclosed comprise the preferred form of putting the invention into effect, and the invention is therefore claimed in any of its forms of modifications within the legitimate and valid scope of the appended claims.

I claim:

1. In a receiver, the method of indicating synchronism or lack of synchronism of a locally generated timing pattern with a transmitted timing pattern of the same repetition rate, the transmitted timing pattern having a series of spaced radio frequency bursts from a corresponding number of transmitter stations of known relative strength at said receiver, the generated timing pattern having a series of substantially square pulses of the same respective width and spacing as said transmitted burst, which comprises:
   isolating the strongest received burst in said transmitted pattern;
   selecting the one pulse in said generated pattern corresponding to the station known to have the greatest received signal strength at said receiver;
   comparing said strongest burst and said selected pulse in relation to time of occurrence; and
   indicating to an operator the state of coincidence of said burst and said pulse.

2. Method in accordance with claim 1 including advancing or retarding said generated timing pattern as indicated to achieve coincidence.

3. In a navigation receiver system having a locally generated timing pattern to be synchronized with a transmitter timing pattern as received, the transmitter timing pattern having a standard repeated series of signal bursts of known time duration and spacing, adjacent bursts being from different known transmitting stations, and the generated timing pattern having a repetitive series of pulses corresponding respectively to said signal bursts in width and spacing; a synchronism indicator comprising:
   means for isolating the strongest received signal burst from said transmitter pattern;
   means for selecting any of said generated timing pattern;
   means for comparing said strongest signal burst and said selected generated pulse in real time relation; and
   means for indicating synchronism or lack of synchronism of said burst and said pulse.

4. Apparatus in accordance with claim 3 wherein said isolating means comprises:
   an envelope detector connected to the IF strip of said receiver system;
   a DC restorer connected to the output of said envelope detector; and
   a level detector connected to the output of said DC restorer whereby the output of said level detector is a single pulse signal corresponding in width and time to each occurrence of said strongest received burst.

5. Apparatus in accordance with claim 3 wherein said selecting means comprises manually operated selector switch means connected to suitable generator means in said receiver system having separate terminals where a pulse appears on each terminal corresponding only to respective station pulses in said generated timing pattern.

6. Apparatus in accordance with claim 3 wherein said comparing means comprises a difference amplifier having said strongest burst and said selected pulse fed to the two respective inputs thereof, the output of said difference amplifier being a zero signal when said strongest pulse and said selected pulse are coincident.

7. Apparatus in accordance with claim 6 including a zero center DC meter connected to the output of said amplifier.